Figure 1:
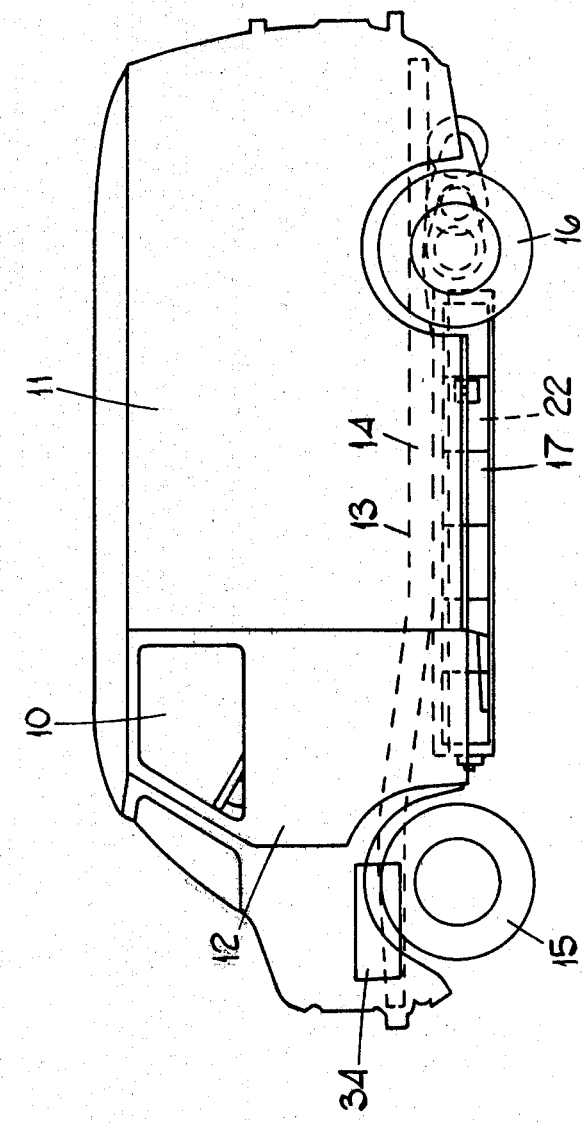

United States Patent [19]

Fowkes et al.

[11] 4,339,015
[45] Jul. 13, 1982

[54] ELECTRICALLY DRIVEN VEHICLES

[75] Inventors: Ronald Fowkes, Solihull; Geoffrey G. Harding, Allostock, near Knutsford, both of England

[73] Assignee: Lucas Industries Limited, Birmingham, England

[21] Appl. No.: 165,486

[22] PCT Filed: Feb. 13, 1979

[86] PCT No.: PCT/GB79/00031
§ 371 Date: Oct. 16, 1979
§ 102(e) Date: Oct. 1, 1979

[87] PCT Pub. No.: WO79/00630
PCT Pub. Date: Sep. 6, 1979

[30] Foreign Application Priority Data

Feb. 16, 1978 [GB] United Kingdom ............... 6121/78

[51] Int. Cl.³ .............................................. B60L 11/12
[52] U.S. Cl. ..................... 180/65 R; 105/51; 180/65 C; 180/68.5
[58] Field of Search ............... 180/65 R, 68.5, 65 A, 180/60, 65 C, 65 B; 105/50, 51, 49; 104/34

[56] References Cited

U.S. PATENT DOCUMENTS

| | | | |
|---|---|---|---|
| 1,165,784 | 12/1915 | Klingelsmith | 180/68.5 |
| 2,111,563 | 3/1938 | Kliesrath | 280/5 A X |
| 2,544,831 | 3/1951 | Guyton | 180/65 R X |
| 3,182,742 | 5/1965 | Dow | 180/65 R X |
| 3,497,027 | 2/1970 | Wild | 180/65 R |
| 3,616,872 | 11/1971 | Taylor | 180/65 C |

Primary Examiner—Joseph F. Peters, Jr.
Assistant Examiner—Milton L. Smith
Attorney, Agent, or Firm—Ladas & Parry

[57] ABSTRACT

An electrically driven motor vehicle having an electric motor 31 arranged to drive the vehicle through a transmission system 29, 33 and a battery pack 22 to provide power for driving the electrical motor 31, the battery pack being provided with a charging unit 25, 26 including an internal combustion engine 26 and the battery pack 22 and the charging unit 25, 26 being mounted on the vehicle as a unit so as to be readily detachable therefrom to enable it to be replaced at suitable servicing establishments.

6 Claims, 3 Drawing Figures

ELECTRICALLY DRIVEN VEHICLES

This invention relates to electrically driven motor vehicles of the kind having a rechargeable battery pack which is arranged to supply electrical power to drive the vehicle, through an appropriate transmission system.

In known vehicles of this kind it has been possible to recharge the batteries by means of a charging unit which runs on liquid fuel or other power source which is not the battery pack itself. Such a battery charging unit is bulky and therefore there have been several proposals for accommodating it, including mounting it in a trailer towed by the vehicle.

Within the practical limits set by the motor vehicle size, the space occupied by a battery pack and its charging unit must be kept to a reasonable minimum. It has furthermore been found that the provision of a battery pack without a charging unit severely limits the range of possible use of the vehicle between charging sessions, during which the vehicle is, perforce, stationary and it is for this reason that a charging unit may be provided. Without incurring a substantial penalty in terms of occupation of space as well as of weight, such a charging unit would not, under most circumstances, do more than retard the rate of discharge of the batteries of the battery pack.

Another alternative which has been tried is to provide a battery pack and electric motor arranged to be driven therefrom and also an internal combustion engine. In this construction, the electric drive is used for acceleration and also possibly for deceleration but when cruising at steady speeds the internal combustion engine is used, preferably at its most efficient speed of operation. However, such a vehicle is greatly complicated by the need for complex controls and dual transmission provision.

The object of this invention is to provide a motor vehicle with a battery pack and a charging unit in a convenient form which will provide a practical range of use of the vehicle.

According to the invention there is provided an electrically driven motor vehicle including an electric motor arranged to drive the vehicle through a transmission system, a battery pack arranged to provide power for driving the electric motor, and a charging unit for charging the battery pack, and characterised in that the battery pack and charging unit are mounted on a common structure which is provided with means whereby it is detachably carried on the vehicle.

Conveniently, the structure on which the battery pack and charging unit are mounted includes a frame which is, at least in part, hollow to provide a storage space for fuel for the charging unit.

According to a further aspect the invention resides in a battery pack and charging unit for an electrically driven motor vehicle, characterised in that a common structure is provided for supporting the battery pack and the charging unit, the structure being provided with means whereby it can be detachably secured to a vehicle.

Figure 2:
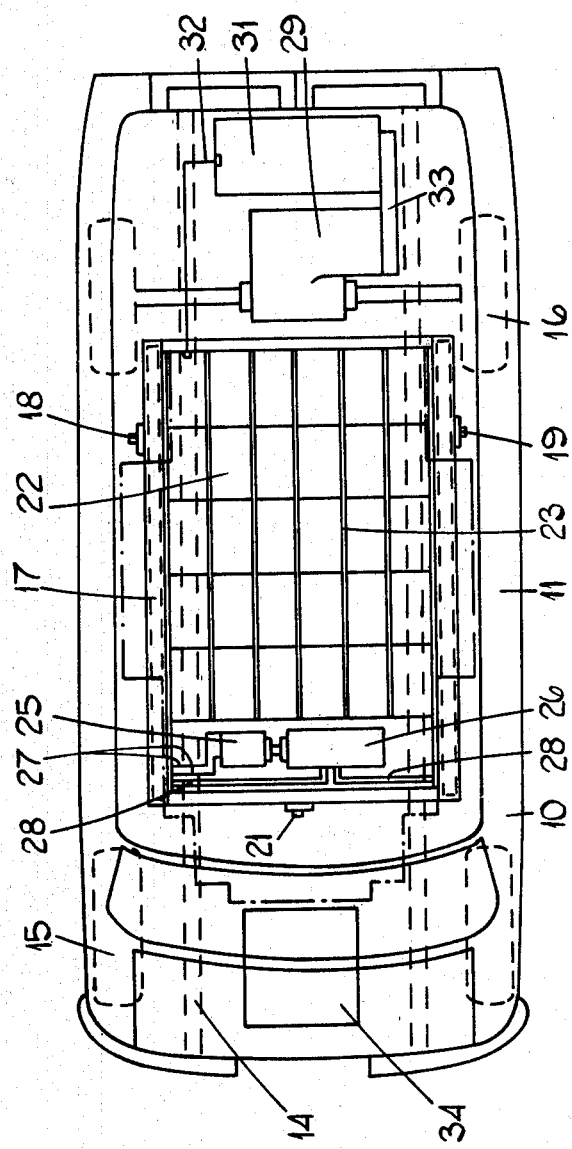
Figure 3:
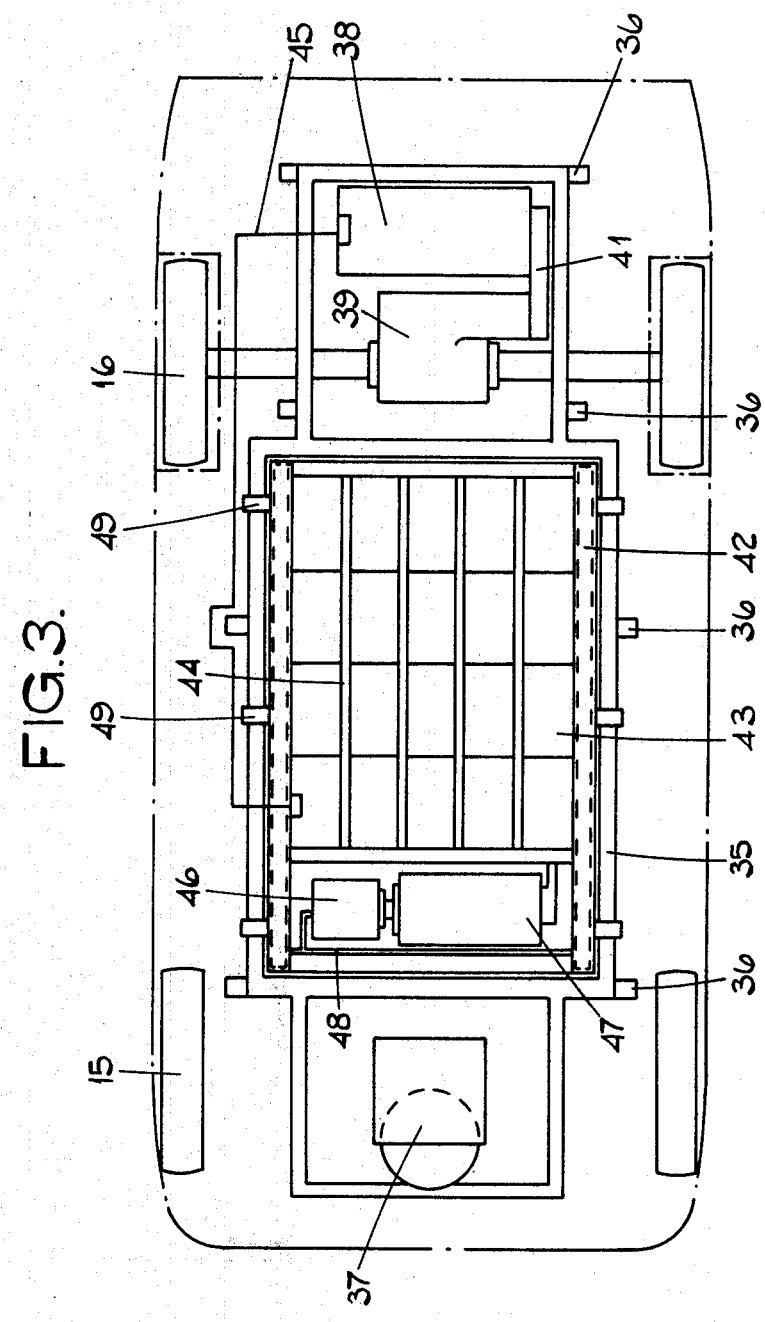

The invention will now be described, by way of example, with reference to the accompanying drawings, in which:

FIG. 1 is a side elevation of a vehicle constructed in accordance with the invention, FIG. 2 is a plan view of the underpart of the vehicle, and FIG. 3 is a plan view of a further alternative construction in accordance with the invention.

The type of vehicle shown in the drawings is a light goods carrying vehicle having a driver's cab portion indicated generally at 10 having side access doors 12 and a goods carrying area indicated generally at 11. This has rear access doors (not shown).

A floor indicated at 13 extends through the vehicle, this being supported on chassis members 14. A pair of front steerable wheels 15 and a pair of driven rear wheels 16 are provided. The vehicle body is of conventional kind and would normally be provided with an internal combustion engine mounted ahead of the driving compartment, and connected with the rear wheels 16 through a conventional transmission system. However, the vehicle is electrically propelled as will be described.

Referring particularly to FIGS. 1 and 2 the electrical drive apparatus is shown therein to include a rectangular frame 17. This is mounted on the underside of the vehicle, below the floor 13, being attached to appropriate fixing brackets by quickly releasable fastenings indicated at 18, 19 and 21, the former two being at the sides and the latter being at the front of the frame 17. Each fastening preferably includes a single screw and there is included means for ensuring registration of the holes through which the bolt passes to secure the frame 17 in position.

Contained within and secured to the frame 17 so as to be detachable as a complete unit are a plurality of batteries 22. These are arranged in rows with fore and aft extending spacers 23. In this example there are twenty 12 volt batteries 22.

The frame 17 also houses, ahead of the batteries 22 a charging unit comprising an internal combustion engine 26 and an electrical generator or dynamo 25. An electrical control device is also provided on this assembly and electrical connections to the batteries 22 are shown generally at 27.

The frame 17 has hollow box section members forming its two longitudinal parallel sides, which form storage tanks for fuel for the internal combustion engine 26 of the charging unit. Fuel supply pipes are indicated at 28 from these tanks to the engine 26.

The whole assembly of frame 17, batteries 22 and charging unit 25 and 26 is therefore detachable as a unit from the vehicle.

Also mounted on the chassis of the vehicle, behind the battery and charging unit assembly is a transmission system 29 for driving the rear wheels and a propulsion electric motor 31 to which the batteries supply power through a cable indicated generally at 32. Between the motor 31 and the transmission 29 is a coupling or drive connection 33. A driver operated electrical control unit 34 is also shown fitted at the front of the vehicle.

In the FIG. 3 construction it is envisaged that the vehicle is of the kind originally fitted with an internal combustion engine and conventional drive to the rear wheels. The vehicle is however modified by removal of these components which are replaced by a complete unit which has attached to it the necessary equipment for electrical drive instead of internal combustion engine drive for the vehicle.

Beneath the floor of the vehicle a frame 35 is secured to the chassis or body of the vehicle by a number of fastening elements indicated at 36. These may include bolted fastenings or other types of fixing. This frame 35 defines three rectangular openings comprising a large central opening and two smaller openings at the ends of the frame, which are thus disposed at the front and rear of the vehicle respectively.

The opening in the portion of the frame 35 at the front of the vehicle contains electrical control equipment indicated generally at 37. In this example, the control equipment is housed in two separate units and it is driver operated.

The opening at the rear of the frame 35 contains an electrical drive motor 38 which is controlled through the control units 37 by the driver. The electric motor 38 drives the rear wheels 16 through a transmission system including a differential 39 and intermediate coupling or drive connection mechanism indicated generally at 41 which includes a step-down drive.

The central opening in the frame 35 contains a detachable assembly. This assembly comprises a rectangular frame 42 in which are secured a plurality of batteries 43. The batteries are arranged in rows with fore and aft extending spacers 44. As in the FIGS. 1 and 2 example, there are twenty 12 volt batteries. Electrical connection from the batteries to the electric motor 38 is indicated at 45, comprising a connecting lead on the assembly, having a plug engageable in a socket in the vehicle.

The frame 42 also houses, ahead of the batteries 43 a charging unit. This comprises an internal combustion engine indicated generally at 46. This is coupled to a dynamo 47. An electrical control for the charging unit is also provided on the assembly.

The frame 42 has hollow box section members along its two parallel longitudinally extending sides. These members form storage tanks for liquid fuel for running the internal combustion engine 46 of the charging unit, as in the FIGS. 1 and 2 construction. Fuel supply pipes are indicated at 48.

The whole of the assembly including the battery pack and the charging unit are detachably mounted within the main frame 35. Detachable fastening elements between the frame 42 and the frame 35 are indicated at 49. These are preferably of the quickly releasable type referred to in the equivalent positions in FIGS. 1 and 2.

In use, the vehicle is driven by the electric motor 38 under driver control, the motor being supplied with electrical power from the battery pack which comprises the batteries 43.

The charging unit may be operated if required. Generally, on a relatively long journey, the battery pack would be continuously charged by the charging unit. This has the effect of retarding the discharge rate of the battery pack or maintaining the state of charge thereof. The charging unit would not generally be of a size to provide the battery pack with a rate of charge greatly in excess of normal requirements. The arrangement greatly increases the practical range of such a vehicle as compared with a vehicle fitted only with a battery pack and without any charging unit.

It is intended in use that the battery pack and charging unit assembly may be exchanged at suitable servicing establishments either for another similar unit or for a battery pack having no charging unit but having the same overall dimensions and a fixing arrangement as the assembly shown in the drawings. If a vehicle is intended for short journeys, the battery pack is used and this is charged when the vehicle is not in use or exchanged for another charged battery pack but if the vehicle is to be used on longer journeys, the battery pack and charging unit assembly is used.

Though shown fitted in a goods carrying vehicle the battery pack and charging unit assembly can be used in other forms of vehicle including passenger carrying private motor vehicles.

We claim:

1. In an electrically driven motor vehicle including an electric motor 31 arranged to drive the vehicle through a transmission system 29,33, a battery pack 22 arranged to provide power for driving the electric motor 31. and a charging unit 25,26 for charging the battery pack 22, said charging unit including a prime mover 26, the improvement wherein the battery pack 22 and charging unit 25,26 are mounted on a common structure 17 carried directly on the vehicle chassis and detachably secured thereto by releasable fasteners 18,19,21 whereby the assembly comprising said battery pack, charging unit and common structure is detachable as a complete unit from the vehicle.

2. An electrically driven motor vehicle as claimed in claim 1, wherein the prime mover 26 is a fuel using device and the common structure on which the battery pack 22 and charging unit 25,26 are mounted includes a frame 17 which is, at least in part, hollow to provide a storage space for fuel for the prime mover.

3. An electrically driven motor vehicle as claimed in claim 1 or claim 2, in which the prime mover 26 is an internal combustion engine.

4. A battery pack and charging unit combination for an electrically driven motor vehicle, wherein said combination comprises a common structure 17 on which the battery pack 22 and the charging unit 25,26 are mounted, the charging unit including a prime mover 26, the structure 17 being provided with means 18,19,21 for detachably securing it to the chassis of a vehicle, said structure having mounted thereon said battery pack and charging unit.

5. A battery pack and charging unit combination as claimed in claim 4, wherein the prime mover 26 is a fuel using device and said common structure comprises a frame which, at least in part, is hollow to provide a storage space for fuel for the prime mover.

6. A battery pack and charging unit combination as claimed in claim 4, or claim 5, wherein the prime mover 26 is an internal combustion engine.

* * * * *